United States Patent

Evely

[11] Patent Number: 4,717,523
[45] Date of Patent: Jan. 5, 1988

[54] THERMOPLASTIC CONTAINER FORMING METHOD

[75] Inventor: William W. Evely, Chardon, Ohio
[73] Assignee: Ball Corporation, Muncie, Ind.
[21] Appl. No.: 923,510
[22] Filed: Oct. 27, 1986

Related U.S. Application Data

[62] Division of Ser. No. 714,733, Mar. 22, 1985, Pat. No. 4,650,628.
[51] Int. Cl.⁴ ............................................. B29C 49/04
[52] U.S. Cl. .................................................. 264/527
[58] Field of Search ............. 264/150, 294, 566, 500, 264/520, 527, 531, 532, 540–543, 536

[56] References Cited

U.S. PATENT DOCUMENTS

| | | | |
|---|---|---|---|
| 3,125,619 | 3/1964 | Miller | 264/532 |
| 3,456,290 | 7/1969 | Ruekberg | 264/540 |
| 3,457,590 | 7/1969 | Dittman | 264/540 |
| 3,479,420 | 11/1969 | Wilson et al. | 264/540 |
| 3,496,258 | 2/1970 | Wiley | 264/532 |
| 3,596,315 | 8/1971 | Yoshikawa et al. | 425/532 |
| 3,599,284 | 8/1971 | Osa et al. | 425/532 |
| 3,662,048 | 5/1972 | Turner | 264/520 |
| 3,809,521 | 5/1974 | LaFosse | 264/540 |
| 3,920,782 | 11/1975 | Cogswell | 264/520 |
| 4,233,019 | 11/1980 | Sawa et al. | 264/543 |
| 4,348,167 | 9/1982 | Virog, Jr. | 425/532 |

FOREIGN PATENT DOCUMENTS 2634382 7/1977 Fed. Rep. of Germany ...... 264/531

Primary Examiner—Jan H. Silbaugh
Assistant Examiner—Neil M. McCarthy
Attorney, Agent, or Firm—Gilbert E. Alberding

[57] ABSTRACT

Apparatus and method are provided for straightening a parison tube (58b) in an apparatus of the type in which thermoplastic tubing (48) is extruded into open halves (24 and 26) of a blow mold (22) and a parison tube (58b) is severed from the thermoplastic tube (48) concurrently with the blow mold being rotated around an axis (28). The present invention orients the curvature of the parison (58b) in a predetermined plane (52) by accelerating the parison tube (58b) transversely to the axis (90) of the parison tube (58b); and then the parison tube (58b) is straightened by applying jets of air (76) against the neck and moil portion (68) of the parison tube (58b), thereby straightening the parison tube (58b), and thereby preventing the neck and moil portion (68) of the parison tube (58b) from being pinched between the mold halves (24 and 26) in the area of the neck and moil cavity (38).

5 Claims, 5 Drawing Figures

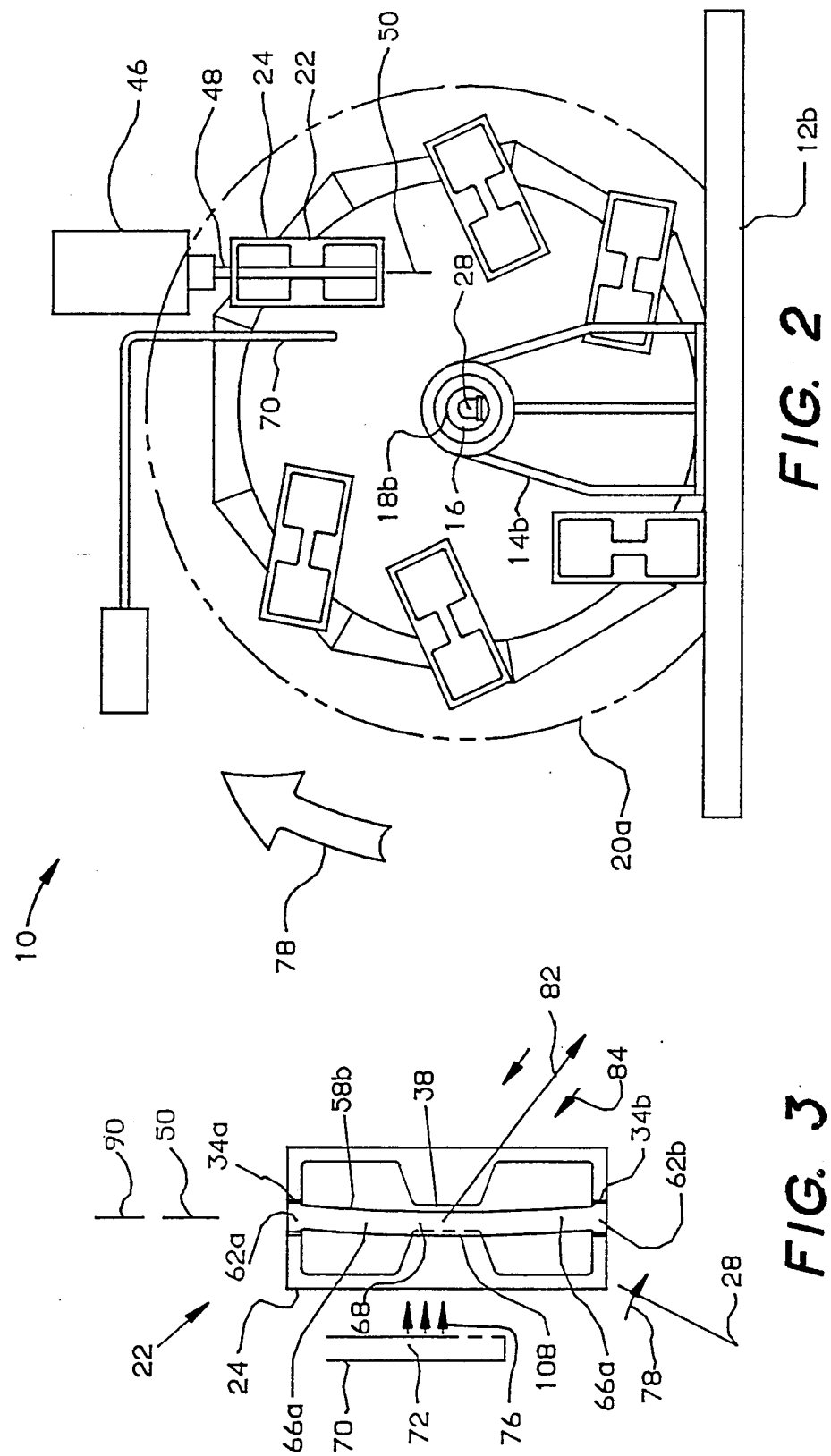

THERMOPLASTIC CONTAINER FORMING METHOD

This application is a division, of application Ser. No. 714,733, filed Mar. 22, 1985, which is now U.S. Pat. No. 4,650,628 issued Mar. 17, 1987.

BACKGROUND OF THE INVENTION

1. Field of the Invention

The present invention relates generally to apparatus and method for making containers from thermoplastic materials. More particularly, the present invention relates to apparatus and method for blow molding a pair of containers from a parison tube of extruded thermoplastic tubing, and for correcting curvature in the parison tube that causes parison tubes to be pinched between the mold halves rather than being enclosed within the neck and moil cavity and that results in flashing of plastic material along the pinched portion and non-uniform wall thicknesses in finished containers.

2. Description of the Prior Art

It is common practice to form containers from thermoplastic materials by extruding a thermoplastic tubing from a crosshead, forming a parison tube by severing a portion of the thermoplastic tubing, placing the parison tube into a blow mold, and then blow molding the parison tube to the contour of the blow mold.

Further, it has been common practice to place a number of blow molds on a rotating table in such a fashion that each blow mold opens and straddles the thermoplastic tubing as the thermoplastic tubing is being extruded from the crosshead, to sever a parison tube from the tubing, to grasp the parison tube between the mold halves, and to blow a container from the parison tube.

An example of this prior art is the subject matter of U.S. Pat. Nos. 2,515,093 and 2,579,390 which were issued to Mills. In these prior art patents, a horizontally disposed table rotates about a vertical axis, and the thermoplastic tubing is extruded horizontally towards the blow mold.

Typically, the thermoplastic tubing is extruded continuously, and the blow molds move continuously around the pivot axis of the table to which they are mounted. As each blow mold is aligned with the thermoplastic tubing, the blow mold is closed, a parison tube is severed from the thermoplastic tubing, the parison tube is grasped by a holding portion that is adjacent to the crimped-off end of the parison tube, a body portion of the parison tube is enclosed in a body cavity of the blow mold, and a neck and moil portion of the parison tube is enclosed in a neck and moil cavity of the blow mold.

As a given blow mold progresses around the pivotal axis, air is introduced inside the parison tube, blowing the parison tube to the contour of both the body cavity and the neck and moil cavity. Then the blow mold is opened, and the finished container is removed.

Subsequently, both the holding portion and the moil are removed from the finished container, the neck of the container is reamed, and the seal face of the container neck is smoothed by the application of heat.

Typically, the thermoplastic tubing is extruded to the largest diameter that will fit into the blow mold; so the outside diameter of the thermoplastic tubing will be slightly smaller than the diameter of the neck and moil cavity.

One major problem in rotary blow molding equipment is precise alignment of the parison tube into the mold cavity. The parison tube must be aligned concentrically in the mold to assure that, upon inflation of the parison tube, it will expand uniformly.

If the parison tube is not positioned properly in the mold halves, upon closing, the mold halves may nip one side of the parison tube. If one side of a parison tube is nipped between the closing mold halves, the blown container will have flash on one side, and there will be an uneven distribution of the parison material.

Uneven distribution of the parison material will result in a finished container that is thin on one side and that may rupture at some later time; or uneven distribution of the parison material may result in the container bursting during the blow molding operation.

Proper alignment of the parison tube in the mold halves is highly dependent upon straightness of the parison tube. If there is bowing or curvature in the parison tube, one side of the parison tube will be pinched between the mold halves at the neck and moil cavity, as opposed to the parison tube being enclosed inside the neck and moil cavity.

As described above, a portion of the parison tube being pinched between the mold halves results in unequal wall thicknesses in the finished container with the possibility of rupturing in use, or even in the container wall rupturing during the blow molding process. Thus, it is important to avoid, to minimize, or to correct any bowing or curvature in the parison tube.

In U.S. Pat. No. 3,764,250, Waterloo recognized the problem of curvature in the thermoplastic tubing and provided apparatus for correcting the problem.

Waterloo devised blow mold apparatus in which the blow molds are mounted onto a vertically disposed table that rotates about a horizontal axis. The thermoplastic tubing is extruded upwardly; and the blow molds engage the thermoplastic tubing at a rotational position wherein each blow mold moves upwardly and away from the crosshead, with the objective of the blow mold pulling and straightening the thermoplastic tubing as it is being extruded.

On the other hand, there may be a number of factors that are responsible for the bowing of newly extruded plastic tubing during the process of blow molding such tubing into containers and the like. One particular factor that seemingly plays a role in the bowing or curving of such tubing is the movement of the molds in a blow molding machine of the rotary type.

That is, the molds are moving continuously in a circular path as the mold halves grasp the parison tube near the ends thereof. As the ends of the parison tube are being grasp by the mold halves, the mold halves are moving along the circular path. Thus, because of the continuous movement of the molds in a circular path, the mold halves impart an acceleration to the parison tube as the mold halves change the velocity of the parison tube to be in the same direction as, and equal to, the mold halves.

Also, as can be recognized, the parison tube is not and deformable upon being clamped off by flattening the ends thereof. It is believed that this clamping and flattening of the ends of the parison tube result in a lengthening of the parison tube; and, since the ends of the parison tube are restrained between the partially closed mold halves, the excess length results in a bowing or curving of the parison tube.

Also, curvature in a parison tube may be due to uneven flow in the crosshead, so that the thermoplastic tubing has a curvature as it is being extruded; or the thermoplastic tubing may develop a curvature due to gravity, such as in the apparatus of Mills wherein the thermoplastic tubing is extruded horizontally.

It appears that the apparatus of Waterloo might be effective in correcting curvature resulting from uneven flow in the crosshead, or in correcting curvature resulting from extrusion of the thermoplastic tubing along a horizontal axis. However, his apparatus would not be effective in correcting curvature due to lengthening of the parison tube due to clamping of the ends of the parison tube.

The acceleration on the parison tube is generally along the axis of the extruded tubing in the apparatus of Waterloo because the axis of extrusion is substantially tangential to the rotary movement of the closing mold halves.

While the apparatus of Waterloo minimizes acceleration loads that are transverse to the parison tube, and while this arrangement would seem, at first glance, to minimize curvature due to transverse acceleration of the parison tube, it is believed that the longitudinal acceleration that is imparted to the parison tube lengthens the parison tube, between the clamped-off ends thereof, and results in stretching longitudinal portions of the parison tube that are attempting to accelerate other longitudinal portions of the parison tube. Then, this lengthening of the parison tube between the clamped-off ends results in bowing or curvature of the parison tube.

Further, even though the apparatus of Waterloo does minimize acceleration loads on the parison tube that are transverse to the extrusion axis, it will be shown subsequently that minimizing transverse acceleration loads is a disadvantage, when seen in the light of the present invention.

The problems of curvature in the parison tube have become increasingly severe because of an increase in the rates at which thermoplastic material may be extruded from crossheads.

One way to increase the ability of blow molding apparatus to keep abreast with increased extrusion rates, and to increase blow molding productivity, is to increase the velocity of the blow molds as they are rotated around their pivotal axis.

This increase in rotational velocity of the blow molds has increased the required closing velocity of the blow mold, which has increased the clamping velocity, thereby increasing the lengthening and resultant curvature of the parison tube. This increase in closing velocity of the blow mold also has decreased the time in which the curvature of the parison tube may be corrected by being deflected into the neck and moil cavity.

Another way to increase the ability of blow molding apparatus to keep abreast with increased extrusion rates and to increase blow molding productivity is to use a blow mold that includes cavities for two separate containers. Blow molds for extruding containers in pairs is taught by Ruekberg in U.S. Pat. No. 3,456,290.

Blow molding containers in pairs (so-called "logged" blow molding) results in a parison tube that is approximately twice as long as the parison tube for a single container, thus increasing curvature problems in the parison tube whether caused by curvature in the tubing as extruded, by gravity forces on thermoplastic tubing that is extruded horizontally, by clamp-off, or by acceleration forces, whether longitudinally along the extrusion axis or transversely to the extrusion axis.

The severity of the problem can be seen in the fact that, quite often, the parison tube will have a length of at least ten diameters when two containers are formed simultaneously in a single blow mold by a single inflation.

In the past, it has been more practical to extrude the thermoplastic tubing vertically, as opposed to horizontally, for blow molding thermoplastic containers, because of gravity-caused deformation of the tubing.

However, vertical extrusion of the thermoplastic tubing has meant that the blow molds must rotate in a vertical plane around a horizontal axis; and this arrangement has resulted in the height of the blow mold apparatus being excessive, even to the extent of limiting machine capacity because of the height of factory ceilings.

With the economic necessity of blow molding containers in tandem, and with the doubling of the length of the parison tube when blow molding containers in tandem, the problems of deflection of horizontally extruded tubing have increased tremendously.

And yet, with this economic pressure to blow mold thermoplastic containers in tandem, there has been a simultaneous economic pressure to build larger and faster blow molding machines that include a larger number of blow molds. A larger number of blow molds means that the blow molds are disposed around a larger circumference; and a larger circumference, for horizontally extruded tubing, means greater height of the blow mold apparatus.

In summary, the advantages of being able to correct curvature in the parison tube include; the ability to successfully blow mold containers in tandem, the ability to blow mold containers in tandem with apparatus in which the thermoplastic tubing is horizontally extruded and the height of the apparatus is minimized by rotating the blow molds around a circle in a horizontal plane, improved quality of the containers, and a lower rejection rate in container production.

Thus an objective of the present invention is to provide apparatus and method for reducing the curvature in a parison tube and for enclosing the parison tube in the neck and moil cavity of the blow mold without pinching the parison tube between the halves of the blow mold.

Another object of the present invention is to provide apparatus and method for orienting curvature of a parison tube in a predetermined plane and in a predetermined direction within the plane, and for applying a straightening force to the parison tube that is generally in an opposite direction in the same plane.

Another object of the subject invention is to provide means for assuring the concentricity and straightness of a plastic parison tube within a contoured mold, especially in a tandem mold.

Still another object of the present invention is to provide means for aligning and positioning a parison tube to maintain proper alignment within a mold, and thereby to insure even and uniform expansion of the walls of the parison tube upon inflation.

Still another object of the present invention is to provide means for adjusting the length of the plastic parison tube during its advance from one station to another station, so that bowing or curvature in the parison tube is reduced.

Finally, an object of the present invention is to correct curvature in parison tubes so effectively that containers may be blow molded in tandem using apparatus in which the maximum height of the apparatus is minimized by extruding the thermoplastic tubing horizontally and transporting the blow molds in a circular path of a horizontal plane.

SUMMARY OF THE INVENTION

In the present invention, apparatus in provided in which a crosshead extrudes thermoplastic tubing downwardly along a first axis that lies in a first plane.

A plurality of blow molds are mounted around a rotary table; the rotary table is rotated around a horizontal axis; and the blow molds rotate in the first plane.

Each of the blow molds includes a pair of mold halves. First and second holding cavities are disposed in opposite ends of each mold half, a neck and moil cavity is interposed intermediate of the holding cavities that includes the neck cavities for two containers and a moil between the neck cavities, and first and second body cavities are interposed intermediate of the neck and moil cavity and respective ones of the holding cavities.

The blow molds are openable and closeable by movement along a second axis that is orthogonal to both the first axis and the first plane; and when open, the mold halves straddle the extruding tubing as they are rotated past the first axis.

The first axis of the crosshead may be positioned, for example, somewhat past center; so that, if the rotary table is rotating in the clockwise direction, the blow molds successively close on a portion of the thermoplastic material near the one o'clock position. Thus, the movement of each of the blow molds is transverse to the first axis of the extruding tubing at the times when successive ones of the blow molds close.

As the blow molds close on the extruding tubing, a portion of the tubing is cut off to form a parison tube, the parison tube is grasped between the holding portions of the blow mold, and when the mold halves completely close, the neck and moil portion of the parison tube is enclosed in the neck and moil cavity of the blow mold.

As the mold halves close and grasp the parison tube between the holding cavities of the blow mold halves, the blow mold is moving continuously in a circular path in the first plane. Therefore, as the parison tube is grasped by the mold, the grasped portions of the parison tube are transversely accelerated to provide a direction of movement and a velocity that is the same as the direction of movement and the velocity of the blow mold.

This acceleration results in an inertia force on those portions of the parison tube that are intermediate of the grasped portions of the parison tube.

During the closing of each of the blow molds, a blast of air is directed transversely toward successive ones of the blow molds. This blast of air is directed in the first plane, between the mold halves, against those portions of the parison tube that are intermediate of the holding portions thereof, or more particularly, against the neck and moil portion of the parison tube, and in the direction of movement of the blow molds.

Thus, this blast of air provides a force to the parison tube that is generally opposite to the inertia force that is applied to the parison tube by being accelerated in a direction that is transverse to the first axis, or axis of extrusion.

In addition to providing a straightening force, the blast of air serves to cool the parison tube in the neck and moil portion thereof, increasing the hardness of the parison tube in this area, and thereby cooperating with the neck and moil cavity to force the neck and moil portion into alignment with, and into the neck and moil cavity.

Since the parison tube is of sufficient temperature and sufficient resultant plasticity to allow blow molding, the aforementioned inertia force, as caused by transverse acceleration of the parison tube, results in a tensile force and some stretching of the parison tube, so that the force and some stretching of the parison tube, so that the inertia force causes a bowing of the parison tube away from the direction of movement.

While some lengthening of the parison tube and resultant bowing, as caused by transverse acceleration of the parison tube and the resultant inertia force might be considered to be detrimental, the overall results of this transverse acceleration and inertia force, when combined by the direction of air between the mold halves, is most advantageous.

The transverse acceleration of the parison tube results in curvature of the parison tube being generally positioned in the plane of rotation, and results in the convex side of the curvature being generally directed away from the transverse acceleration of the parison tube.

Therefore, without regard to the causes of excess length and bowing of the parison tube, the transverse acceleration of the present invention predeterminately positions the convex side of the curvature; so that the force of air directed against the parison tube is always in the direction that straightens the parison tube.

Since for a given thermoplastic material, a given crosshead, a given pinch-off rate in the blow molds, and a given closing velocity of the mold halves on the holding portions of the parison tube, the excess length and curvature of the parison tube will be rather consistent with the parison tube curvature predeterminately positioned, and with adjustable air pressure, a force can be applied to the parison tube which applies the force that is necessary to straighten the parison tube.

Further, since the parison tube has been grasped at both ends in the holding portions thereof, application of a transverse straightening force results in longitudinal compressive force and a reduction of the excess length of the parison tube.

Further, the present invention provides a cooling step that cools the neck and moil portion of the parison tube; so that the neck and moil cavity effectively provides a straightening force, as opposed to the blow mold nibbling at one side of the parison tube during closing of the mold halves.

Alternately, the blast of air may be directed through a hole in one of the mold halves, rather than being directed along the first plane and between the mold halves; and, in this alternate configuration, the results are as described for directing air between the mold halves.

While the present invention is particularly advantageous for use with blow molds of the type designed for producing two containers from a single parison tube, the present invention is applicable to thermoplastic container apparatus in which each blow mold forms only a single container.

Whether used with blow molds that form a single container, or whether used with blow molds that form more than one container at a time, the present invention predeterminately positions the curvature of the parison tube in a first direction in a first plane and then applies a transverse straightening force to the parison tube in the opposite direction in the first plane, thereby aligning the parison tube, and thereby preventing said parison tube from being pinched between the mold halves.

While the embodiment herein shows and describes apparatus in which the thermoplastic material is extruded downwardly and the blow molds rotate in a vertical plane, the present invention is particularly advantageous to tandem blow molding of thermoplastic containers by apparatus in which the blow mold rotate in a horizontal plane using thermoplastic from tubing that is extruded horizontally.

BRIEF DESCRIPTION OF DRAWINGS

FIG. 2 is an end elevation of the blow molding machine of FIG. 1, taken substantially as shown by view line 2—2 of FIG. 1 except with one rotary table thereof removed to show the arrangement of the mold halves on the other rotary table, and to show the angular relationship between the extrusion crosshead and the one of the blow molds that receives the parison tube;

FIG. 3 is an enlarged view of the one of the mold halves of FIG. 2, taken substantially as in FIG. 2, showing a parison tube with curvature, and showing the instantaneous velocity of the blow head, the inertia force acting on the parison tube, and the force vectors of three air jets that apply a straightening force to the parison tube;

BEST MODE FOR CARRYING OUT THE INVENTION

Figure 1:
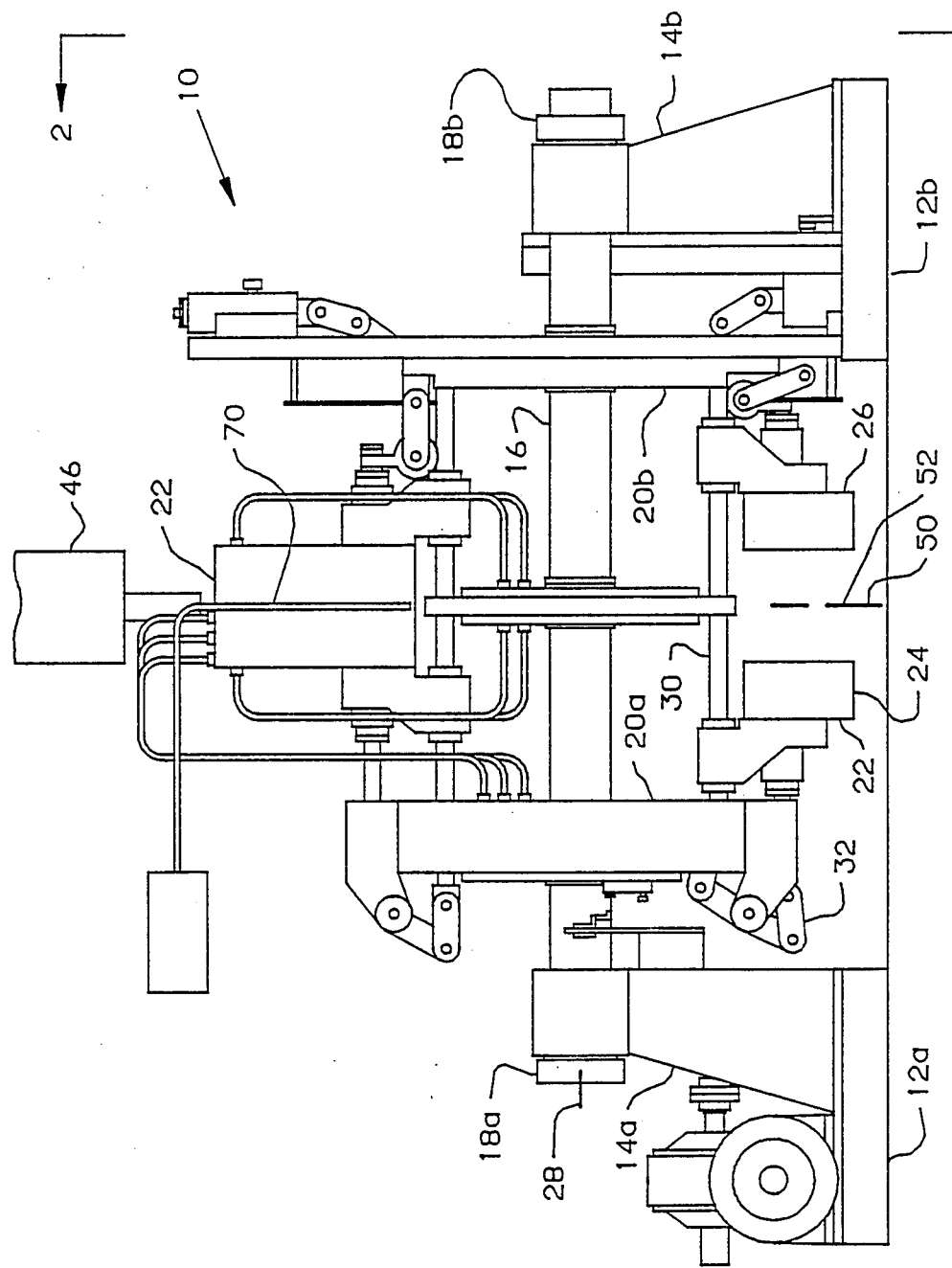
FIG. 1 is a front elevation of a blow molding machine embodying the present invention, showing one blow mold thereof closed, and showing one blow mold thereof open.

Referring to FIGS. 1 and 2, a blow molding apparatus 10 includes base units 12a and 12b, bearing stands 14a and 14b, and a shaft 16 that is supported by the bearing stands 14a and 14b and bearings 18a and 18b. The shaft 16 supports rotary tables 20a and 20b, both of which are shown in FIG. 1; but the rotary table 20b has been removed in the FIG. 2 illustration in order show and describe the present invention.

The blow molding apparatus 10 includes a plurality of blow molds 22, one of which is shown in an open position and one of which is shown in a closed position in FIG. 1. The blow molds 22 each include mold halves 24 and 26, and the mold halves 24 are shown arranged circumferentially around an axis 28 of the shaft 16.

A plurality of guide rods 30 connect the rotary tables 20a and 20b, and the mold halves 24 and 26 are each guidably attached to one of the guide rods 30. An actuating means, which includes a toggle mechanism 32, is attached to one of the rotary tables, 20a or 20b, for each of the mold halves, 24 or 26, to actuate the blow molds 22 to open positions, to closed positions, and to intermediate positions.

Alternately, the blow molds 22 may be operated to open positions, to intermediate positions, and to closed positions by directly applying hydraulic actuators (not shown) to the mold halves 24 or 26.

Figure 4:
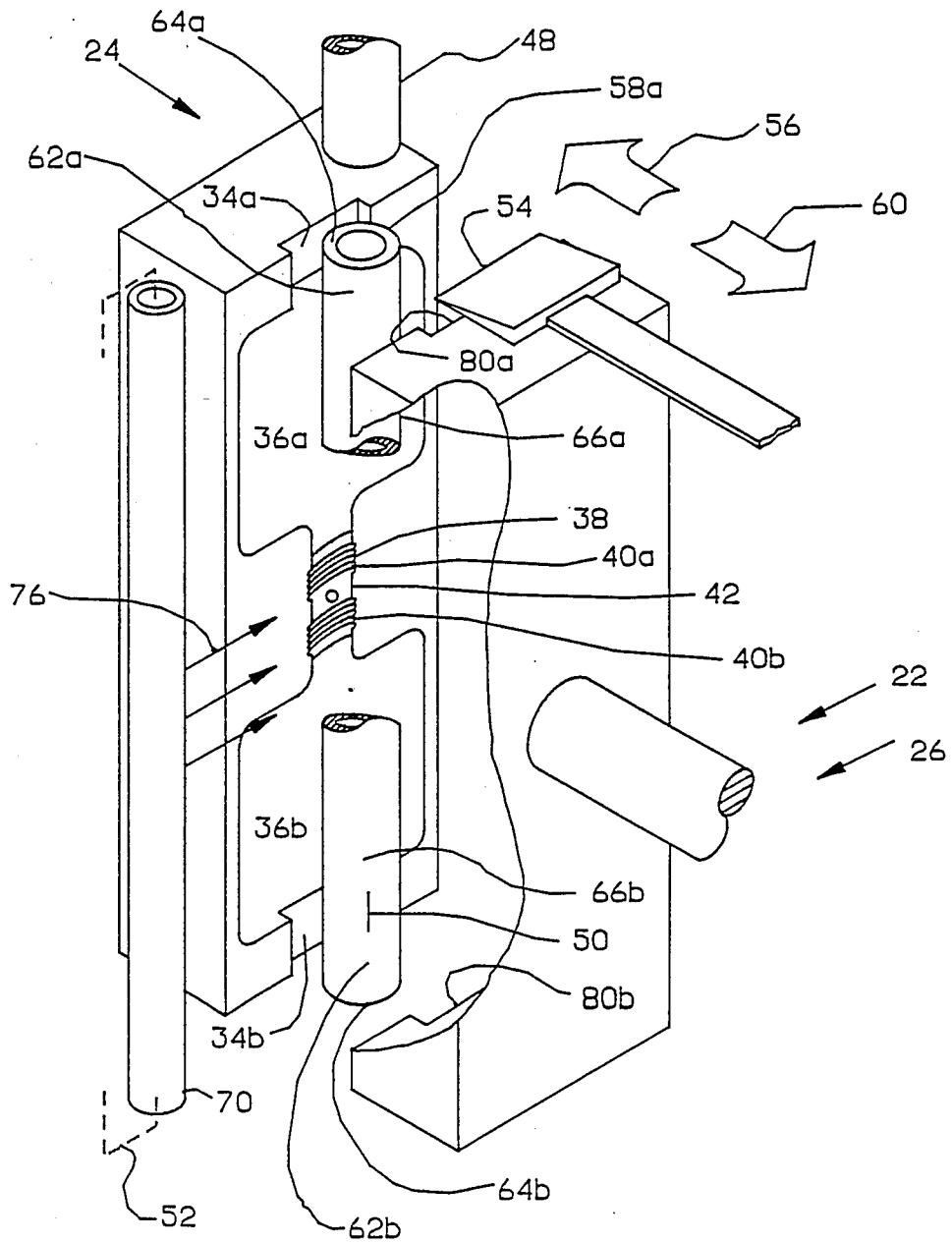
FIG. 4 is an enlarged perspective view of the one of the blow molds that receives the parison tube, showing the extruded tubing between the mold halves immediately subsequent to cut off.

Referring now to FIG. 4, the mold half 24 includes holding cavities 34a and 34b, body cavities 36a includes holding cavities 34a and 34b, body cavities 36a and 36b that are interposed between the holding cavities 34a and 34b, and a neck and moil cavity 38 that is interposed intermediate of the body cavities 36a and 36b. The neck and moil cavity 38 includes neck cavities 40a and 40b and a moil cavity 42 that is interposed intermediate of the neck cavities 40a and 40b.

Referring now to FIGS. 1, 2, and 4, the blow mold apparatus 10 includes a crosshead 46 that extrudes a thermoplastic tubing 48 downwardly along an axis 50, as shown in FIGS. 1 and 2, that lies in a plane 52, as shown in FIG. 1.

A knife 54, that is shown in FIG. 4, moves inwardly, as shown by an arrow 56, to sever a parison tube 58a from the thermoplastic tubing 48, and outwardly, as shown by an arrow 60, to allow the crosshead 46 to extrude the thermoplastic tubing 48 downwardly constantly.

The parison tube 58a includes holding portions 62a and 62b that are proximal to ends 64a and 64b and that correspond longitudinally to the holding cavities 34a and 34b, body portions 66a and 66b that are interposed intermediate of the holding portions 62a and 62b and that correspond longitudinally to the body cavities 36a and 36b, and a neck and moil portion 68 (shown in FIG. 3) that lies intermediate of the body portions 66a and 66b and that correspond longitudinally to the neck and moil cavity 38 of the blow mold 22.

An air supply tube 70, as shown in FIGS. 2–4, is disposed in the plane 52 and is disposed parallel to the axis 50. The air supply tube 70 includes three jet holes 72 that discharge jets of air along axes that are in the plane 52 and that are orthogonal to the axis 50, as represented by straightening force vectors 76.

As can be seen in FIG. 1, the mold halves 24 and 26, in the open positions thereof, are separated from the plane 52. Therefore, the mold halves 24 and 26 straddle the air supply tube 70 as the blow molds 22 rotate past the air supply tube 70.

Referring now to FIGS. 2 and 4, as the thermoplastic tubing 48 is being continuously extruded downwardly along the axis 50, and as the rotary tables 20a and 20b rotate continuously in a clockwise direction, as shown by an arrow 78, the parison tube 58a is severed from the thermoplastic tubing 48 by the knife 54.

At the instant that the parison tube 58a is severed from the thermoplastic tubing 48, the holding portion 62a of the parison tube 58a is grasped by the holding cavity 34a of the mold half 24 and a holding cavity 80a of the mold half 26, and the holding portion 62b is grasped by the holding cavity 34b and by a holding cavity 80b of the mold half 26.

Further, at the instant that one of the blow molds 22 is at the correct angular position, as seen in FIG. 2, to receive the thermoplastic tubing 48, and to grasp the parison tube 58a, the mold halves 24 and 26 are moving toward each other, not only to an intermediate position wherein the parison tube 58a is grasped between the holding cavities 34a and 80a, and 34b and 80b, but also the mold halves 24 and 26 are moving continuously toward a closed position.

Thus, the thermoplastic tubing 48 is being extruded downward continuously, the blow molds 22 are rotating around the axis 28 continuously in a clockwise direction, and, at the instant when a blow mold 22 is at the correct rotational position to receive the thermoplastic tubing 48 and to grasp the parison tube 58a, the blow molds 22 are closing continuously.

Therefore, the parison tube 58a that has been moving downwardly along the axis 50 by virtue of the extrusion of the thermoplastic tubing 48 downwardly, must now be accelerated substantially instantaneously to the instantaneous velocity of the one of the blow molds 22 that has received the parison tube 58a.

Referring now to FIG. 3, a parison tube 58b that is curved is shown with holding portions 62a and 62b clamped against holding cavities 34a and 34b of the mold half 24 by the mold half 26 (shown in FIG. 4). The parison tube 58b is shown overlapping a portion of the neck and moil cavity 38, illustrating the fact that the neck and moil portion 68 of a curved parison tube will be pinched between the neck and moil cavities of the closing mold halves.

A velocity vector 82 illustrates the instantaneous velocity of the mold half 24 at the instant that the mold half 24 is in the angular position in which the thermoplastic tubing 48 is aligned with the mold half 24. Two inertia force vectors 84 illustrate the inertia force that is applied to the parison tube 58b due to the blow mold 22 attempting to accelerate the parison tube 58b to the instantaneous velocity of the blow mold 22.

As shown in the FIG. 3 illustration, the inertia force has oriented the curvature of the parison tube 58b in the plane 52 and in a direction that is generally away from, or lagging, the movement of the blow mold 22. Thus the curvature of the parison tube 58b is directed toward a straightening force that consists of the three straightening force vectors 76. As noted previously, the straightening force vectors 76 represent the force of individual jets of air being directed at the parison tube 58b through the jet holes 72 in the air supply tube 70.

Curvature in the parison tube 58b may be due to curvature in the thermoplastic tubing 48 as the tubing 48 is extruded from the crosshead 46, the curvature may be caused by clamping the holding portion 62a of the parison tube 58a between the holding cavities 34a and 80a and by similar clamping of the holding portion 62b and a resultant lengthening of the parison tube 58b, the curvature may be caused by acceleration of the parison tube 58b generally in the direction of the axis 50 and a resultant lengthening of the parison tube 58b by longitudinal stress, and the curvature may be caused by acceleration of the parison tube 58b in the direction of the velocity vector 82 and a transverse force in the parison tube 58b.

However, without regard to the cause of the curvature in the parison tube 58b, the inertia force, as indicated by the inertia force vectors 84, is effective to orient the curvature of the parison tube 58b generally in the plane 52; so that the straightening force that is applied by compressed air being forced through the jet holes 72, and as illustrated by the straightening force vectors 76, is effective to straighten the parison tube 58b.

Because the ends 64a and 64b of the parison tube 58b are restrained, the application of the straightening force of the force vectors 76 is effective to place a compressive stress in the parison tube 58a that is along a longitudinal axis 90 thereof. Further, because the parison tube 58b is of a temperature that will allow blow molding, the compressive stress in the parison tube 58b results in a shortening of the parison tube 58b as the straightening force is applied thereto. Therefore, the present invention provides not only a straightening means for the parison tube 58b, but also a shortening means for the parison tube 58b.

The straightening means of the present invention includes directing a fluid in a direction that opposes the curvature of the parison tube 58b and that is transverse to the longitudinal axis 90 of the parison tube 58b. Since this fluid applies a force to the parison tube 58b, the present invention provides straightening means that includes a transverse force.

Figure 5:
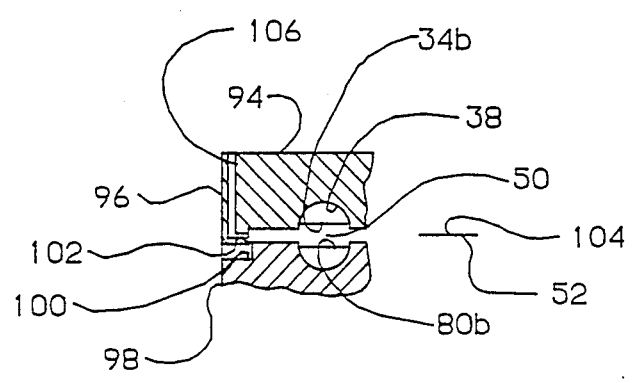
FIG. 5 is an enlarged and partial top view of a blow mold in which one blow mold half includes an air passage for directing air against the parison tube to correct the curvature thereof.

Referring now to FIG. 5, in a modification of the present invention, a mold half 94 includes a projection 96; and a mold half 98 includes a recess 100 that accepts the projection 96. A jet hole 102 in the projection 96 opens in the plane 52 and along an axis 104 that is orthogonal to the axis 50, and the jet hole 102 is supplied with a fluid, preferably air, through a supply hole 106, from a source (not shown).

Thus, in the modification of FIG. 5, the jet hole 102 rotates with, and is a part of, the mold half 94; whereas, in the embodiment previously described, the jet holes 72 are stationary.

It should be recognized that the present invention provides orienting means for orienting the curvature of the parison tube 58b generally in a predetermined plane, that is, the plane 52, and in a predetermined direction, that is, toward the straightening force of the straightening force vectors 76.

Further, the orienting means includes accelerating means, that is, the acceleration of the parison tube 58b to the instantaneous velocity, as shown by the velocity vector 82, of the blow mold 22. Still further, the accelerating means includes means for transporting the blow mold 22 in a circular path; or, the accelerating means includes means for transporting the blow mold 22 in a path that is for transporting the blow mold 22 in a path that is transverse to the axis 50.

The present invention provides means for orienting the curvature of the parison tube 58b generally in a plane 52 and in a predetermined direction in the plane 52; and the present invention provides means for applying a straightening force in a second direction that generally is in a direction that is opposite to the first direction.

It should be recognized that the parison tube 58b, being of a temperature and plasticity that will allow blow molding, is highly susceptible to being pinched between the mold halves 24 and 26 in the area of the neck and moil cavity 38.

Further, the parison tubes 58b have a surface that can best be described as tacky, so it is easy to see that neck and moil cavities, such as the neck and moil cavity 38, are not able to straighten a curved parison and to guide a curved parison down into the neck and moil cavity. However, the present invention provides means for straightening the curved parison by orienting the curvature in a predetermined plane and then applying a straightening force in this same plane.

In addition, it is believed that the applying of the straightening force, which consists of a blast of air, is effective to cool the neck and moil portion 68 of the parison tube 58b, or, at least, to cool a side 108 of the neck and moil portion 68 that is proximal to the straightening force of the air.

Thus, it is believed that the present invention provides means for cooling a portion of the parison tube 58b, and for correcting curvature in the parison tube 58b by applying a transverse force to the parison tube 58b as the parison tube 58b is forced into the neck and moil cavities, such as the neck and moil cavity 38. In contrast, without this cooling means, the neck and moil cavity 38 cannot function dependably as a straightening means.

It should be remembered that the body portion 66a of parison tube 58b must be expanded to several times its diameter; but, in contrast, the neck and moil portion 68 needs to be expanded only slightly to form the threaded neck of the container. Thus, the selective cooling of the side 108 of the neck and moil portion 68 cooperates with the neck and moil cavity 38 to provide a straightening means without interfering with the blow molding process.

The method of the present invention includes: extruding a thermoplastic tubing 48 along an axis 50, severing a parison tube 58b from the thermoplastic tubing 48, grasping a first holding portion 62a of the parison tube 58b between holding cavities 34a and 80a of a blow mold 22, straightening the parison tube 58b, enclosing the first body portion 66a of the parison tube 58b in the body cavity 36a and enclosing the neck and moil portion 68 in the neck and moil cavity 38 of the blow mold 22, blowing a container from the first body portion 66a and the neck and moil portion 68, removing the container from the blow mold 22, and separating the moil (not shown separately) and the holding portion 62a from the container.

The straightening step comprises applying a straightening force 76 to the neck and moil portion 68 of the parison tube 58b; and the step of applying a straightening force 76 comprises directing a fluid transversely (axis 104) against the parison tube 58b.

Further, the straightening step comprises orienting the curvature of the parison tube 58b generally in a predetermined plane 52, and generally toward the straightening force. The step of orienting comprises accelerating the parison tube 58b transversely to the axis 50 of extrusion, or transporting the blow mold 22 in a circular path.

Alternately, or in combination with the method as recited above, the method of the present invention comprises the steps of: cooling the neck and moil portion 68 of a parison tube 58b, and applying a straightening force to the neck and moil portion 68. The step of applying a straightening force comprises forcing the neck and moil portion 68 into the neck and moil cavity 38 of the blow mold 22.

In summary, the present invention provides means for straightening a curved parison tube by orienting the curvature of the parison tube in a predetermined plane and then applying a straightening force to the parison tube; and the present invention provides means for straightening a curved parison tube by cooling a selective portion of the parison tube and then forcing the parison tube into the neck and moil cavity of the blow mold.

While specific apparatus and method have been disclosed in the preceding description, it should be understood that these specifics have been given for the purpose of disclosing the principles of the present invention and that many variations thereof will become apparent to those who are versed in the art. Therefore, the scope of the present invention is to be determined by the appended claims.

INDUSTRIAL APPLICABILITY

The present invention is applicable to blow molding apparatus and methods of the type in which a thermoplastic tubing is extruded from a crosshead into a blow mold, a parison tube is severed from the thermoplastic tubing, and a container, or the like, is blown into conformity with the blow mold.

What is claimed is:

1. A process of maintaining the straightness of a parison tube capable of forming at least two containers having a contoured design from extruded tubing without bending or bowing of said tubing during transportation within cooperating mold dies of a blow molding apparatus comprising moving a plurality of cooperating mold halves along a first path of travel traversing a second path of travel of a parison tube formed from tubing being extruded therein, each cooperating mold half being in an open position to receive the parison tube being advanced therein, each cooperating mold half being provided with at least two major cavities joined by a minor cavity to define at least tandem container configurations, providing each die upon traversing the second path with a parison tube of predetermined length, clamping off end portions of said parison tube, directing just prior to closure of the dies a fluid stream between the spaced apart cooperating mold halves and perpendicular to the longitudinal axis of said parison tube, the force of said fluid stream being essentially sufficient to straighten and correct any bowing of said parison tube, and inflating the clamped-off portion of the parison tube so that the walls of the parison tube are brought out against the major and minor cavities in substantial conformity therewith to form at least two containers of a contoured design.

2. A process as recited in claim 1 wherein the blow molding apparatus is a rotary blow molding machine for forming two connecting containers.

3. A process as recited in claim 1 wherein the parison tube that is clamped off has a length to diameter ratio of between about 10:1 to about 20:1.

4. A process as recited in claim 1 wherein the fluid stream is directed along the opening formed between said cooperating mold halves, said stream presenting its greatest force substantially towards the portion of the parison tube formed by the minor cavity to thereby straighten and correct any bowing or bending of the parison tube prior to inflation.

5. In a process of molding hollow articles in a rotary blow molding machine having mold halves for clamping off a top and bottom portion of plastic tubing advanced between said mold halves when in an open position and thereafter inflating said tubing against the walls of at least two body cavities formed therein and joined together by a narrower intermediate cavity, an improvement in aligning said tubing between continuously moving mold halves in said rotary blow molding machine, particularly along the narrower intermediate cavity portion and thereby avoiding unnecessary pinching off of the tubing within the confines of the intermediate cavity, said improvement comprising introducing just prior to mold closure of said mold halves a stream of fluid directed between said mold halves and substantially perpendicular to the longitudinal axis of the tubing, said stream exerting a force effective to cause the concentricity of said tubing within the narrow intermediate cavity upon closure of said mold halves about said parison tube.

* * * * *